March 10, 1959

F. E. PAYNE ET AL 2,877,026

SEALING DEVICE FOR A SWIVEL JOINT
HAVING PLURAL FLUID PASSAGES
Filed Feb. 9, 1954

INVENTORS
FRANK E. PAYNE
JAMES H. THAYER
BY
Edward R. Lowndes

United States Patent Office 2,877,026
Patented Mar. 10, 1959

2,877,026

SEALING DEVICE FOR A SWIVEL JOINT HAVING PLURAL FLUID PASSAGES

Frank E. Payne, Glencoe, and James H. Thayer, Chicago, Ill., assignors to Crane Packing Company, Chicago, Ill., a corporation of Illinois Application February 9, 1954, Serial No. 409,128

3 Claims. (Cl. 285—94)

The improved sealing device comprising the present invention is designed primarily for use in operating chucks for lathes or the like and, toward this end the invention relates to means for conducting air to the opposite sides of a piston operating in a cylinder, as well as to means for sealing the air at the several places where it is necessary to prevent escape thereof or to prevent commingling of the separate air streams involved. The invention however is capable of other uses and the same may, if desired, with or without modification, be employed in connection with either pneumatic or hydraulic equipment for sealing a fluid passing through a rotary joint having associated therewith a plurality of separate fluid passages. Irrespective however of the particular use to which the present invention may be put, the essential features thereof are at all times preserved.

It is among the principal objects of the invention to provide a novel and improved joint capable of efficiently maintaining substantially leakless communication between two or more fluid-conducting channels while at the same time maintaining the individual channels of one set in constant communication with corresponding channels of another set during rotation of one set of channels relative to the other.

A further object of the invention, in an apparatus of the character briefly outlined above, is to provide a sealing device having associated therewith a plurality of individual rotary mechanical seal assemblies, all of which may be of identical construction and which are so arranged in the assembly that they will consume but very little space, thus resulting in an assembly which is extremely compact yet highly efficient in its operation.

A still further object of the invention is to provide such a seal assembly wherein the individual seal assemblies or units are readily removable from the assembly for the purpose of inspection, replacement or repair.

Still another object of the invention is to provide a seal assembly of this character in which provision is made for adequately lubricating the seal assemblies.

The provision of a swivel-type assembly which is highly efficient in its operation, one which is comprised of a minimum number of relatively moving parts and which therefore is unlikely to get out of order; one which is rugged and durable and which therefore is possessed of an extremely long life; one which is capable of ease of assembly and disassembly without requiring the use of special tools, and one which otherwise is well adapted to perform the services which are required of it, are further desiderata that have been borne in mind in the production and development of the present invention.

Other objects and advantages of the invention, not at this time enumerated, will become more readily apparent as the following description ensues.

In the accompanying single sheet of drawings forming a part of this specification, a preferred embodiment of the invention has been shown.

Figures 1, 2:
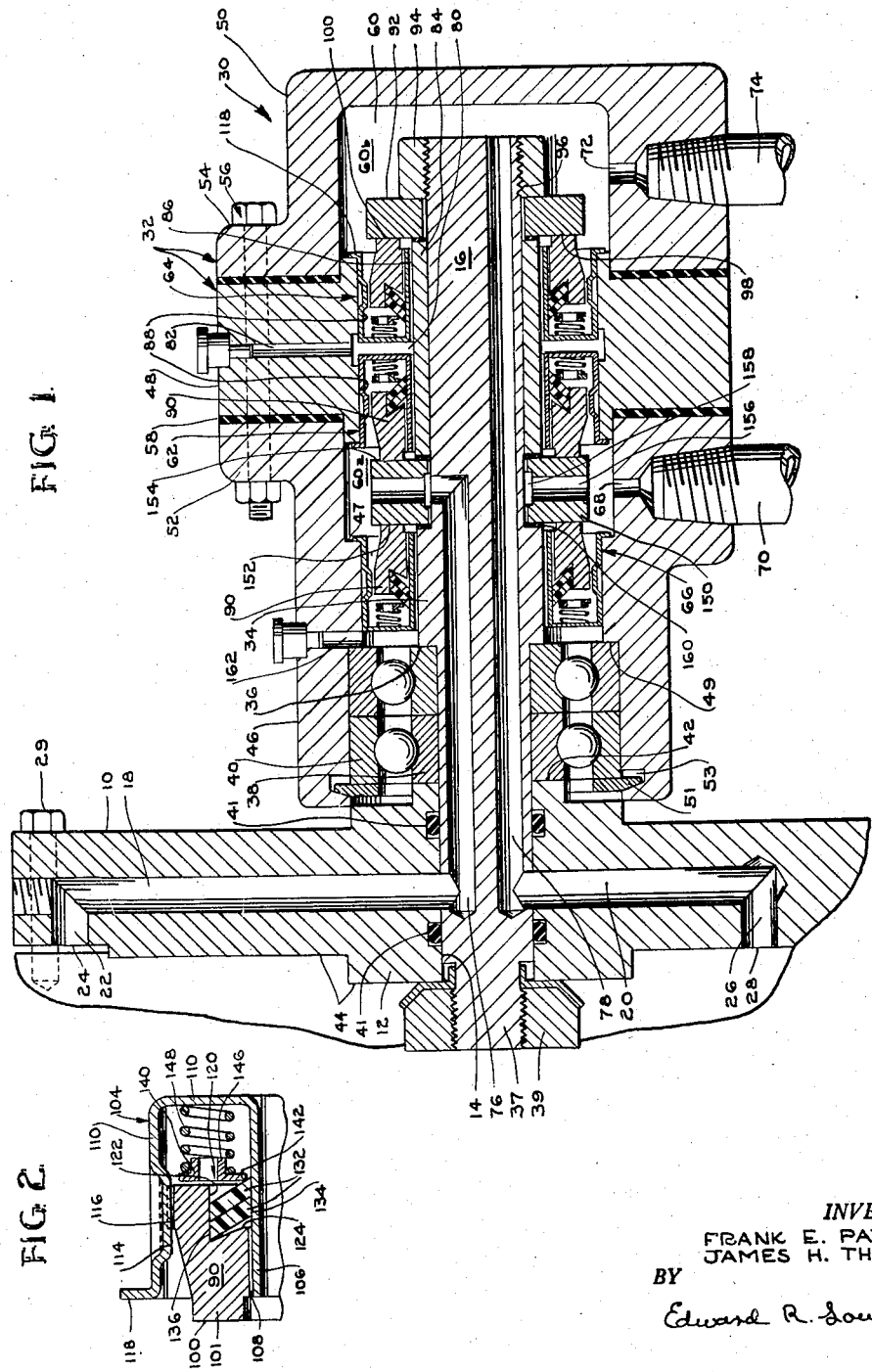
Fig. 1 is a sectional view taken substantially centrally through a rotary or swivelled sealing joint constructed in accordance with the principles of the present invention.
Fig. 2 is an enlarged sectional view taken substantially centrally through one of a plurality of seal assemblies employed in connection with the rotary joint of Fig. 1.

The sealing assembly selected for illustration herein is adapted to be applied to a pneumatic reversing mechanism (not shown) which in turn is used for operating a chuck or the like, the mechanism including a cylinder having a reciprocable piston disposed therein and to the opposite ends of which cylinder air under pressure is adapted to be applied through the cylinder head or end cap. The cylinder head only has been shown, this head being designated in its entirety at 10. The head 10 is generally in the form of a disk having a central hub portion 12 provided with a central opening 14 therethrough. The head 10 is fixedly mounted on a central rotatable spindle or shaft 16 and is formed with a pair of oppositely extending radial passages 18 and 20 respectively. The passage 18 extends from the central opening 14 to a region adjacent the periphery of the head from whence it extends laterally as at 22 to provide a port 24 on the inside face of the head 10. The passage 20 also communicates with the opening 14 and extends radially a relatively short distance to a point just beyond the hub 12 from whence it is turned laterally as at 26 to provide a port 28 likewise on the inside face of the head. It will be understood of course that the head 10 is designed for attachment in any suitable manner, as for example by means of cap screws 29, to one end of the chuck operating cylinder which has fragmentarily been shown, with the port 24 in communication with a passage provided in the cylinder wall leading to the remote side of the cylinder and with the port 28 in communication with the interior of the cylinder so that air under pressure alternately applied to the ports 24 and 28 will build up pressures within the cylinder on opposite sides of the piston to actuate the latter and cause opening and closing of the chuck. The present invention is directed primarly to a sealed swivel connection for connecting a supply of air under pressure to the cylinder as it rotates with the chuck.

The connecting device for accomplishing this purpose is in the form of a unitary compact assembly designated in its entirety at 30, of which the previously mentioned shaft or spindle 16 constitutes the rotor and which has associated therewith a stator in the form of a composite casing or housing 32. The shaft 16 is rotatably mounted within the housing 32 and is adapted to rotate in unison with the cylinder 10. In order to clamp the shaft 16 and cylinder head 10 together and effect such rotation in unison, the shaft is formed with a radial thickened portion 34 providing a forwardly facing shoulder 36. The shaft 16 projects through the opening 14 provided in the cylinder head 10 and the forward end of the shaft is reduced as at 37 and threadedly receives thereon a clamping nut 39. A ball bearing assembly including inner and outer races 38 and 40 respectively is adapted to have its inner race 38 clamped between the shoulder 36 of the shaft 16 and an outside face 42 provided on the hub 12 when the nut 39 is tightened against the inside face 44 provided on the hub. Sealing elements in the form of conventional O-rings 41 are provided between the head 10 and shaft 16 on opposite sides of the passages 18 and 20.

The composite casing 32 includes a forward tubular section 46, an intermediate section 48 and a rear end cap 50. The section 46 is provided with a radial flange 52 while the end cap 50 is formed with a similar flange 54. The intermediate section 48 is of ringlike design and is adapted to be clamped between the two flanges 52 and 54 by means of through-bolt assemblies 56. Suitable gaskets 58 are interposed between the meeting faces of the three sections 46, 48 and 50. The section 46 is formed with an internally thickened portion 47 providing a forwardly facing shoulder 49 against which the outer races 40 of the bearing assemblies are adapted to be clamped, these races being held in position by means of a snap ring 51 seated within an internal annular groove 53 formed in section 46.

The composite casing 32 affords an internal space 60 into which the shaft or spindle 16 projects. The space 60 is divided into two annular chambers 60a and 60b, these chambers being separated from each other by means of a dual seal assembly including composite sealing units 62 and 64 which may be substantially identical in construction and which are arranged in back-to-back or tandem relationship as will be described presently. These two seal assemblies 62 and 64 effect a two-way seal between the stator and rotor elements in the medial regions of the space 60. A third seal assembly 66 which also may be identical with the assemblies 62 and 64 serves to effect a seal between the stator and rotor elements adjacent the end of the space or chamber 60 which contains the bearing assemblies 38, 40.

The chamber 60a has a port 68 which communicates with an air supply pipe 70 which is threaded to engage with the section 46 of the housing. The chamber 60b has a port 72 which communicates with an air supply pipe 74 likewise threaded to engage with the end cap 50. The port 68 of the chamber 60a is connected through a passage 76 formed in the shaft 16 and through a radial passage 18 in the cylinder head 10 with the port 24 leading to one side of the air chuck cylinder. The port 72 of the chamber 60b communicates through a second passage 78 and through a passage 20 with the port 28 leading to the other side of the air chuck cylinder. The seal assembly 64 is adapted to prevent passage of air under pressure in the chamber 60b to the chamber 60a so that substantially all of the air admitted to this former chamber through the port 72 and pipe 74 will be directed into the passage 78. The seal assembly 62 is designed to prevent air introduced into the chamber 60a from passing to the chamber 60b while the seal assembly 66 is designed to prevent air in the chamber 60a from passing to the atmosphere through the left hand end of the composite casing assembly 32.

Inasmuch as the composite casing 32 and the pipes 70 and 74 leading thereto remain stationary while the cylinder including the head 10 rotates at a comparatively high speed, and inasmuch as air under extremely high pressure must be admitted to the cylinder and exhausted therefrom through both moving and stationary parts, considerable difficulty has been encountered in preventing leakage of the air from a high pressure part of the system to a low pressure part thereof or to the atmosphere. The arrangement of the various sealing units 62, 64 and 66 is such that leakage of air will be prevented while at the same time the sealing units themselves will last for a considerable length of time. The three sealing units disclosed herein are of identical construction and accordingly it is thought that a description of one of them will suffice for the others.

Each assembly is adapted to be positioned between an inner surface of the composite housing 32 and an outer surface on the shaft 16. In the case of the seal assemblies 62 and 64, the inner annular surface of the casing section 48 is formed with a medial internal groove 80 which may extend completely around the surface and which communicates with a radial bore 82 designed for supplying lubricant to the space 60 in the vicinity of the seal assemblies 62 and 64 to lubricate these latter assemblies. A sleeve 84 surrounds the shaft 16 adjacent the rear end thereof and presents a cylindrical outer surface 86 in opposition to the two inner surfaces 88 of the section 48 existing on opposite sides of the groove 80. The seal assemblies 62 and 64 are disposed within the space 60 between the surface 86 and the two surfaces 88.

Each seal assembly involves in its general organization a washer element 90 (see also Fig. 2) designed for cooperation with a seat element. The seat element is designed for turning movement with the shaft 16 while the washer 90 is adapted to be held stationary with the composite housing 30. In the case of the seal assembly 64, the seat element 92 is in the form of a ring which is preferably formed of cast iron and which is clamped against the end of the sleeve 84 by means of a clamping nut 94 threadedly received as at 96 on the extreme rear end of the shaft 16. The seat element 92 is formed with a radial face 98 which is preferably lapped to a high degree of flatness and which is designed for running sealing engagement with a similar radially extending lapped face or sealing surface 100 provided on the washer element 90. The washer element 90 is formed with a reduced nose portion 101 in its forward regions and this nose portion defines the extent of the radial sealing surface 100. The washer 90 is preferably molded from any of the materials commonly used in the construction of such sealing washers as for example the materials disclosed in the United States patent to Teeple, 2,326,000, dated August 3, 1943.

The washer 90 is adapted to slide axially within a sealed retainer or casing 104 in the form of a hollow shell which, in the case of the assemblies 62 and 64, surrounds the sleeve 84 and which is formed with a central tubular or cylindrical portion 106 which projects into a central opening 108 provided in the washer. The retainer is also formed with an outer cylindrical wall 110 which encompasses at least a part of the washer 90. In order to maintain the washer 90 against rotation relative to the retainer 104 while at the same time permitting limited axial sliding movement of the washer in the retainer, a series of inwardly struck lugs or indentations 114 are formed in the cylindrical wall 110 of the retainer and these indentations extend into respective longitudinal grooves 116 formed in the outermost peripheral surface of the washer 90. As stated above, the retainer 62 is adapted to be snugly received within the inner surface 88 of the ring or section 48 by a pressed fit. A locating flange 118 is formed at the outer rim of the retainer.

The washer 90 as clearly shown in Fig. 2 is provided with a circular recess 120 in the rear face providing a central cylindrical bore 122. The bottom of the recess presents a conical surface 124.

In order to seal the washer 90 to the central tubular portion 106 of the retainer 104, a plurality of sealing rings or cone frusta 132 encircle the cylindrical wall 106 and are nested within the cylindrical bore 122. The frusto-conical members 132 are preferably formed of a material which possesses a considerable degree of resistance to compressional forces without undergoing deformation and each member is provided with a cylindrical inner periphery 134 designed for sealing engagement with the cylindrical part 106 of the retainer. Each member 132 is also provided with an outer cylindrical periphery or rim 136 designed for sealing engagement with the cylindrical bore of the recess 120 provided in the sealing washer 90. The slant angle of the frusto-conical sealing members 132 may vary within certain limits but in any case, the slant height of the cone frustum will be in excess of the radial distance between the cylindrical wall 106 and the bore 122. The slant angle of the members 132 shown in Fig. 2 is approximately 55° but it will be understood of course that other slant angles are contemplated, the particular angle here being a function of the desired pressure to be maintained at the sealing edges of these members. The frusto-conical members 132 are convex as viewed from the left hand side of Fig. 2 (looking toward the sealing washer 90) and the forward rim of the foremost cone frustum seats at the bottom recess 120 and against the cylindrical bore 122. The slant angle of the conical surface 124 on the washer 90 is preferably less acute than the slant angle of the sealing member 64 so that the cone frustum of the inner member 132 will not bind on the surface 124.

A thrust member consisting of a ring 140 is disposed within the retainer shell 104 and surrounds the inner cylindrical wall 106 thereof. The internal diameter of the ring 140 is slightly greater than the outside diameter of the wall 106 so that the ring 140 remains slightly spaced from this wall. The inner peripheral edge 142 of the ring 140 is preferably slightly rounded and is adapted to bear against the foremost frusto-conical member 132. A plurality of circular bosses 146 are struck out from the plane of the ring 140 at equally spaced points therearound and each of these bosses 146 serves as a centering device for the forward end of a coil spring 148. The rear end of each coil spring 148 is adapted to seat against the end wall 110 of the retainer shell 104. The various springs 148 which may be of any suitable number, six preferably being employed, serve to normally urge the thrust ring 140 toward the left as viewed in Fig. 2 so that the inner periphery thereof exerts a pressure on the rearmost frusto-conical member 132 near the small base of the cone frustum. The two frusto-conical members 132 are thus normally urged in the direction of the sealing washer 90 and a wedging action obtains whereby the body of each frusto-conical member tends to straighten out in radial fashion but is prevented from doing so because of the space limitations provided for it. In this manner a strong wedging action, the effect of which is a function of the slant height of the cone frustum relative to the radial distance between the two cylindrical walls 106 and 112, is attained to produce a very effective sealing action.

It has previously been stated that the material from which the frusto-conical members 132 are formed is relatively incompressible. The term "incompressible" as employed herein refers to the inability of the material to decrease in overall volume when subjected to a compressional force. In other words the material lacks compressibility. One material which fulfills the requirements of such a seal is a polytetrafluorethylene polymer which is manufactured and sold by E. I. du Pont de Nemours and Co. under the trade name "Teflon."

The above description is applicable to the seal assembly 64 and it is also applicable to the sealing assemblies 62 and 66 but these latter assemblies cooperate in sealing relationship with a common seat element 150 having oppositely facing radial lapped sealing surfaces 152 and 154 respectively. The seat element 150 is in the form of a ring which is telescopically received over the shaft or spindle 16 and which occupies a position between the sleeve 84 and the thickened portion 34 of the shaft. The ring 150 is formed with a series of radially extending passages 156 therein each of which communicates with an internal groove 158 provided in the ring member 150 and this groove 158 is in constant communication with the passage 76 which in turn communicates with the passage 18 in the head 10 leading to the forward side of the air chuck cylinder C. Interposed between the ring 150 and the sleeve 84 and thickened portion 34 respectively are suitable gaskets 160.

As stated above, the lubricating channel or bore 82 serves the two seal assemblies 62 and 64. Similarly, a lubricating channel 162 provided in the casing section 46 serves the seal assembly 66.

The rotary sealed swivel connection described above is such that whenever fluid pressure is supplied to the pipe 74 from any suitable pressure source, it is transmitted through the chamber 60b and passages 78, 20 and 26 to the port 28, from whence it enters the cylinder C on one side of the piston therein to move the piston away from the head 10 and operate the chuck clutch mechanism to close the clutch. Full pressure is applied to the cylinder C through the passages just mentioned by virtue of the fact that the fluid is sealed by the sealing assembly 64 against escape to the chamber 60a. During reverse operation wherein the pressure in the pipe 74 is released and fluid pressure is applied to the other pipe 70, the fluid enters the chamber 60a and is transmitted through passages 156, 158, 76, 18 and 22 to the port 24 from whence it is conducted through the wall of the cylinder to the other side of the piston to move the latter toward the head 10 and thus cause operation of the chuck mechanism to open the chuck jaws. The seal 62 prevents fluid pressure from escaping to the chamber 60b while the seal 64 prevents the fluid from escaping around the shaft 16 to the atmosphere.

The invention is not to be limited to the exact arrangement of parts shown in the accompanying drawings or described in this specification as various changes in the details of construction may be restorted to without departing from the spirit of the invention. For example, while the invention has been illustrated and described in connection with an air-operated chuck mechanism, it will be understood that the same may readily, either with or without suitable modification, be employed for other purposes as for example in the operation of reversible power transmissions or in fact, wherever a rotary joint is required for the selective transmissions of fluid. Only insofar as the invention has been particularly pointed out in the accompanying claims is the same to be limited.

What we claim and desire to secure by Letters Patent is:

1. In a swivel joint including relatively rotatable members each having a pair of passages therein for the conduction of fluid between said members, one of said members in part defining a housing into which the other of said members extends, a plurality of seal means dividing the housing into three chambers, one of said three chambers providing direct communication between a first one of each of the pairs of passages, a lubricant in the second of the three chambers and contacting two of said seal means, a third of said seal means completing the partly defined first-mentioned housing, and also defining with one of the two said seal means the third chamber, said third chamber being in fluid communication with the second of each of the pair of passages, and means for lubricating the third of said seal means, wherein the said one of said relatively rotatable members is comprised of opposed spaced flanged elements, a spacer disposed between the flanged elements and fastening means clamping the flanged elements to the spacer, said seal means each being comprised of relatively rotatable cooperating parts, and a part of each of the two seal means contacted by the lubricant being frictionally held in the spacer.

2. In a swivel joint including relatively rotatable members each having a pair of passages therein for the conduction of fluid between said members, one of said members in part defining a housing into which the other of said members extends, a plurality of seal means dividing the housing into three chambers, one of said three chambers providing direct communication between a first one of each of the pairs of passages, a lubricant in the second of the three chambers and contacting two of said seal means, a third of said seal means completing the partly defined first-mentioned housing, and also defining with one of the two said seal means the third chamber, said third chamber being in fluid communication with the second of each of the pair of passages, and means for lubricating the third of said seal means, wherein the said one of said relatively rotatable members is comprised of opposed spaced flanged elements, a spacer disposed between the flanged elements, and fastening means clamping the flanged elements to the spacer, said seal means each being comprised of relatively rotatable cooperating flexible seal assemblies and seal seats, the seal assemblies being interchangeable and frictionally held in the said one of said relatively rotatable members.

3. In a swivel joint including relatively rotatable members each having a pair of passages therein for the conduction of fluid between said members, one of said members in part defining a housing into which the other of said members extends, a plurality of seal means dividing the housing into three chambers, one of said three chambers providing direct communication between a first one of each of the pairs of passages, a lubricant in the second of the three chambers and contacting two of said seal means, a third of said seal means completing the partly defined first-mentioned housing, and also defining with one of the two said seal means the third chamber, said third chamber being in fluid communication with the second of each of the pair of passages, and means for lubricating the third of said seal means, wherein said seal means is comprised of relatively rotatable cooperating flexible seal assemblies and seats, the assemblies and seats being disposed in axial spaced relation such that a first seal assembly is rotationally held in one relatively rotatable member, a first seat is held on the second relatively rotatable member with a radial face of the first seat in operative engagement with the first seal assembly, a second seal assembly is rotationally held in said one relatively rotatable member and in operative engagement with an obverse face of the said first seat, a third seal assembly is rotationally held in said one relatively rotatable member axially spaced from the second seal assembly and a second seat is held on the second relatively rotatable member with a radial face of the second seat in operative engagement with the third seal assembly, all of said seal assemblies being substantially identical and interchangeable.

References Cited in the file of this patent

UNITED STATES PATENTS

| | | |
|---|---|---|
| 1,277,607 | La France | Sept. 3, 1918 |
| 1,851,723 | Neidow | Mar. 29, 1932 |
| 2,049,955 | Gilbert | Aug. 4, 1936 |
| 2,352,636 | Jackman | July 4, 1944 |
| 2,420,626 | Stevenson | May 13, 1947 |
| 2,568,092 | Sloan et al. | Sept. 18, 1951 |
| 2,626,166 | Fawick | Jan. 20, 1953 |
| 2,637,491 | Fitzsimmons | May 5, 1953 |
| 2,693,373 | Tremolada | Nov. 2, 1954 |

FOREIGN PATENTS

| | | |
|---|---|---|
| 555,389 | Great Britain | Aug. 20, 1943 |